United States Patent
Yang et al.

(10) Patent No.: US 12,351,268 B2
(45) Date of Patent: Jul. 8, 2025

(54) BICYCLE COMPONENT AND PAIRING METHOD THEREOF

(71) Applicant: TEKTRO TECHNOLOGY CORPORATION, Changhua County (TW)

(72) Inventors: Chia-Hao Yang, Changhua County (TW); Hsun-Yu Chuang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 1056 days.

(21) Appl. No.: 17/156,982

(22) Filed: Jan. 25, 2021

(65) Prior Publication Data

US 2021/0276664 A1 Sep. 9, 2021

(30) Foreign Application Priority Data

Mar. 4, 2020 (TW) .................................. 109107092

(51) Int. Cl.
*B62M 25/08* (2006.01)
*B62M 9/122* (2010.01)

(52) U.S. Cl.
CPC ............ *B62M 25/08* (2013.01); *B62M 9/122* (2013.01)

(58) Field of Classification Search
CPC .............................. B62M 25/08; B62M 9/122
See application file for complete search history.

(56) References Cited

U.S. PATENT DOCUMENTS

| 6,459,222 | B1 * | 10/2002 | Chen | ........................ | B62M 6/60 |
| | | | | | 318/434 |
| 2012/0178364 | A1 * | 7/2012 | Dobyns | ............. | H04M 1/72412 |
| | | | | | 455/41.1 |
| 2016/0152302 | A1 * | 6/2016 | Nishino | ................. | B62M 25/08 |
| | | | | | 701/2 |

FOREIGN PATENT DOCUMENTS

DE    102013014332 A1 * 3/2014 .............. B62M 6/50

\* cited by examiner

*Primary Examiner* — Jacob D Knutson
(74) *Attorney, Agent, or Firm* — Troutman Pepper Locke LLP; Tim Tingkang Xia, Esq.

(57) ABSTRACT

A bicycle component comprises a main body and a controller. The main body comprises an attaching portion configured to attach to a bicycle. The controller is disposed in the main body, wherein the controller is configured to electrically connect to one of a first power source and a second power source, the first power source and the second power source are different in an electricity characteristic, and the controller comprises: a power detecting module configured to determine whether a power received by the controller is from the first power source or the second power source; and a wireless transmission module electrically connecting to the power detecting module, wherein the wireless transmission module performs a pairing procedure when the power detecting module determines that the power received by the controller is from the first power source.

8 Claims, 5 Drawing Sheets

BICYCLE COMPONENT AND PAIRING METHOD THEREOF

CROSS-REFERENCE TO RELATED APPLICATIONS

This non-provisional application claims priority under 35 U.S.C. § 119(a) on Patent Application No(s). 109107092 filed in Taiwan, ROC on Mar. 4, 2020, the entire contents of which are hereby incorporated by reference.

BACKGROUND

1. Technical Field

The present disclosure relates to a bicycle component, and more particularly to a bicycle component and a pairing method which perform pairing operation according to the electricity characteristic.

2. Related Art

Due to the development of wireless communication technology, it has been a popular trend to use the wireless communication method to connect left/right shift levers and front/rear derailleurs in an electronic gear-shifting system of a bicycle. Pairing the left shift lever with the front derailleur and pairing the right shift level with the rear derailleur are common pairing methods. The pairing operation establishes a communication connection between two bicycle components and stores the identification information of the two bicycle components. After the pairing operation is completed, the shift levers can send the shifting signal to the front/rear derailleurs.

However, current pairing methods of electronic gear-shifting systems of bicycles are not convenient and friendly enough for general consumers. For example, the consumer needs to read the instruction guides of the electronic gear-shifting system before he can correctly press a specific button on a bicycle component in a specific manner to complete the pairing operation between the bicycle components. For another example, the consumer must use a third-party device and a specific operating method to complete the pairing operation of bicycle components. So far, there is still a lack of a bicycle component which allows the consumer to complete the pairing operation without complicated operations mentioned above after said bicycle component is inserted with a battery and activated.

SUMMARY

Accordingly, the present disclosure provides a bicycle component and pairing method thereof so that the consumer may complete the pairing operation right after powering on the bicycle component without complicated button operations. Said bicycle component does not have additional buttons, and adopts an integrated design to reduce the gap around the button, thereby improving its waterproof ability.

According to one or more embodiment of this disclosure, a bicycle component comprising: a main body comprising an attaching portion configured to attach to a bicycle; and a controller disposed in the main body, wherein the controller is configured to electrically connect to one of a first power source and a second power source, the first power source and the second power source are different in an electricity characteristic, and the controller comprises: a power detecting module configured to determine whether a power received by the controller is from the first power source or the second power source; and a wireless transmission module electrically connecting the power detecting module, wherein the wireless transmission module performs a pairing procedure when the power detecting module determines that the power received by the controller is from the first power source.

According to one or more embodiment of this disclosure, a bicycle component comprising: a main body comprising an attaching portion configured to attach to a bicycle; and a controller disposed in the main body, wherein the controller is configured to receive a power, and the controller comprises: a power detecting module configured to determine whether an electricity characteristic of the power conforms to a range; and a wireless transmission module electrically connecting the power detecting module, wherein the wireless transmission module is configured to perform a pairing procedure; wherein the power detecting module commands the wireless transmission module to perform the pairing procedure when the power detecting module determines that the electricity characteristic conforms to the range.

According to one or more embodiment of this disclosure, a bicycle component comprising: a main body comprising an attaching portion configured to attach to a bicycle; and a controller disposed in the main body, wherein the controller is configured to receive a power, and the controller comprises: a power detecting module configured to determine whether an electricity characteristic of the power conforms to a range; and a wireless transmission module electrically connecting the power detecting module, wherein the wireless transmission module is configured to perform a pairing procedure; wherein the power detecting module prevents the wireless transmission module from performing the pairing procedure when the power detecting module determines that the electricity characteristic does not conform to the range.

According to one or more embodiment of this disclosure, a pairing method of a bicycle component comprising: activating a power source, wherein the power source is electrically connected to a controller of the bicycle component; determining whether an electricity characteristic of a power provided by the power source conforms to a range by a power detecting module of the controller after the power source is activated; selectively performing a working procedure by the controller when the electricity characteristic does not conform to the range; and selectively performing a pairing procedure by the controller when the electricity characteristic conforms to the range; wherein the pairing procedure comprises pairing with another controller of another bicycle component by the controller; and the working procedure comprises sending or receiving a shifting signal by the controller.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
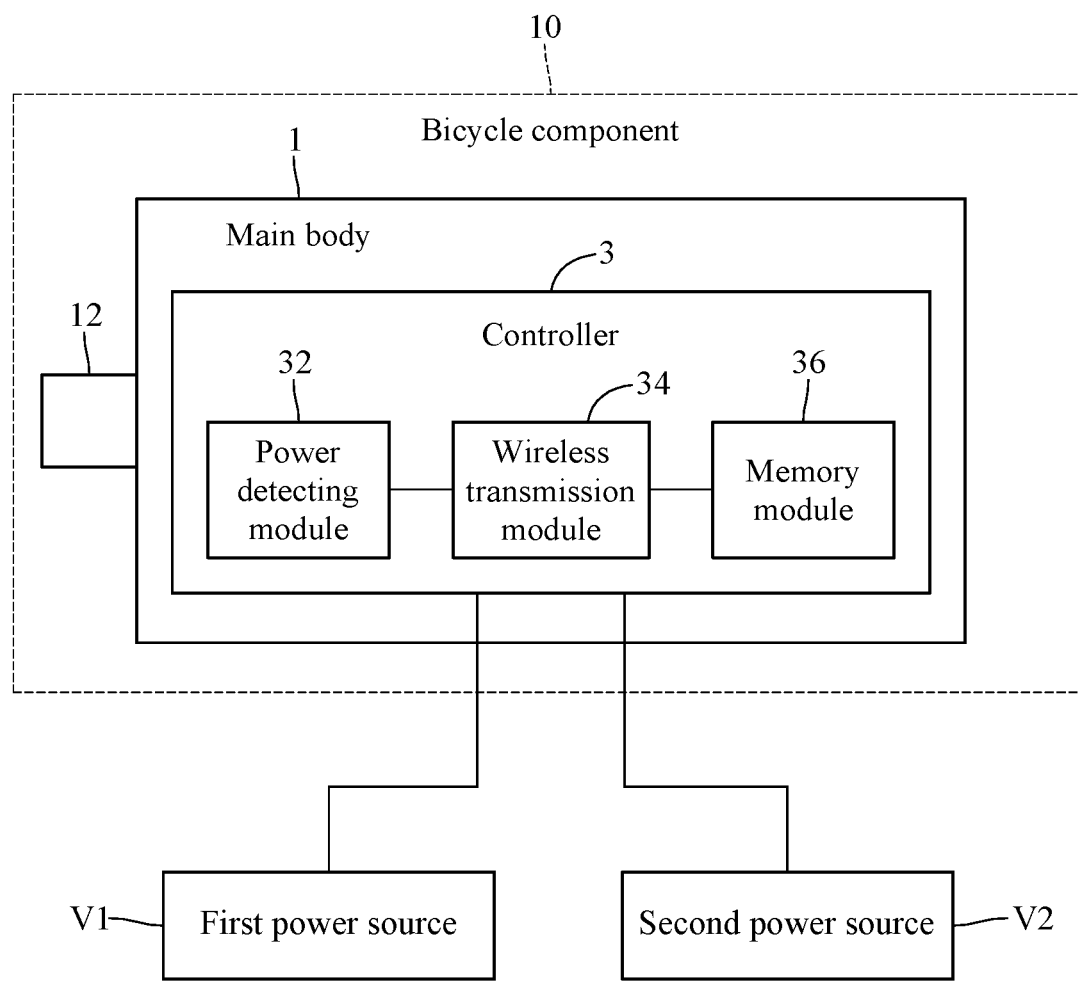
FIG. 1 is a block diagram of the bicycle component according of an embodiment of the present disclosure.

Please refer to FIG. 1, which illustrates a block diagram of a bicycle component according to an embodiment of the present disclosure. The bicycle component 10 comprises a main body 1 and a controller 3.

The main body 1 comprises an attaching portion 12 to attach to a bicycle. In an embodiment, the main body 1 has a shell, and the controller 3 is disposed inside the shell of the main body 1. For example, the main body 1 is a shift operating unit (left/right shift lever) or a shift derailleur unit (front/rear derailleur), a speeding measuring device or a braking device. However, the present disclosure does not limit the main body 1 by the above examples.

Figure 2:
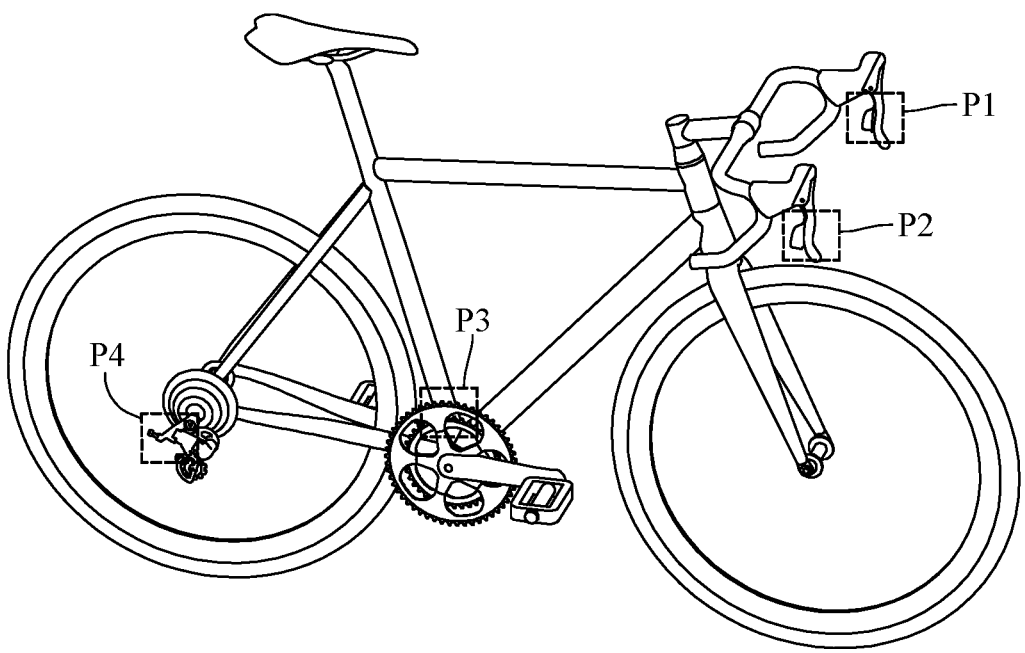
FIG. 2 is a schematic diagram showing the bicycle and the installation position of the bicycle components.

Please refer to FIG. 2, which illustrates a schematic diagram of the bicycle B and the installation positions of the bicycle component 10. In the example shown in FIG. 2, the bicycle component 10 can be disposed in position P1 (which is equivalent to the installation position of the left shift lever), position P2 (which is equivalent to the installation position of the right shift lever), position P3 (which is equivalent to the installation position of front derailleur), or position P4 (which is equivalent to the installation position of the rear derailleur). However, positions P1-P4 mentioned above are examples for illustration and are not used to limit the installation position of the bicycle component 10 of the present disclosure.

The controller 3 is configured to perform a working procedure and a pairing procedure. The controller 3 may send or receive the shifting signal of the bicycle B during the working procedure. The controller 3 may send/receive the pairing signal to/from another controller of another bicycle component during the pairing procedure.

In practice, the controller 3 may adopt an embedded controller (EC), a micro control unit (MCU) or an application-specific integrated circuit (ASIC). The present disclosure does not limit the hardware type of the controller 3.

Please refer to FIG. 1. The controller 3 is configured to be electrically connected to one of a first power source V1 and a second power source V2, and thereby obtaining the power required for the controller's operation. FIG. 1 shows the example that the controller 3 is electrically connected to the first power source V1. The first power source V1 and the second power source V2 are removably connected to the controller 3.

For example, the first power source V1 is a power supply. The manufacturer of the bicycle component 10 installs the power supply on a jig so that the bicycle component 10 may be electrically connected to the first power source V1.

For example, the second power source V2 is a battery. The consumer inserts a rechargeable battery or a mercury battery into the bicycle component 10 as the second power source V2 to provide the power required for the controller's operation.

As mentioned above, the power provided by the first power source V1 is different from the power provided by the second power source V2. In other words, the range corresponding to the electricity characteristic of the first power source V1 is different from the range corresponding to the electricity characteristic of the second power source V2.

In an embodiment, the electricity characteristic is a voltage, and the voltage range of the first power source V1 is greater than the voltage range of the second power source V2. For example, regarding the second power source V2, the rechargeable battery inserted by the consumer is usually 2-cell lithium battery which may provide a voltage of 6-8.4 volts. Regarding the first power source V1, the jig used by the manufacturer comprises a booster circuit that can boost the voltage provided by the power supply to 9 volts or higher.

In another embodiment, the electricity characteristic is a pulse-width modulation (PWM), and a range of a modulation frequency of the first power source V1 is greater than a range of a modulation frequency of the second power source V2.

In the present disclosure, the relationship between the ranges corresponding to the power characteristics of the first power source V1 and the second power source V2 is not limited to the above example. For example, in other embodiments, the voltage range of the first power source V1 is smaller than the voltage range of the second power source V2, and the range of the modulation frequency of the first power source V1 is smaller than the range of the modulation frequency of the second power source V2.

Please refer to FIG. 1. The controller 3 comprises a power detecting module 32, a wireless transmission module 34 and a memory module 36.

The power detecting module 32 may be implemented with hardware (such as system on chip) or firmware (such as the program code burned in the controller 3). The power detecting module 32 is configured to determine whether an electricity characteristic of the power conforms to a range.

The wireless transmission module 34 is electrically connected to the power detecting module 32 and the memory module 36. The wireless transmission module 34 may send wireless signals in a broadcast manner or scan wireless signals around itself. The wireless transmission module 34 is configured to perform the pairing procedure or the working procedure.

In an embodiment, the power detecting module 32 is configured to determine whether the power received by the controller 3 comes from the first power source V1 or the second power source V2. The wireless transmission module 34 performs the pairing procedure when the power detecting module 32 determines that the power received by the controller 3 comes from the first power source V1. The wireless transmission module 34 performs the working procedure when the power detecting module 32 determines that the power received by the controller 3 comes from the second power source V2.

In another embodiment, the power detecting module 32 determines whether the electricity characteristic of the power received by the controller 3 conforms to a range. The power detecting module 32 commands the wireless transmission module 34 to perform the pairing procedure when the power detecting module 32 determines that the electricity characteristic conforms to the range. For example, if the power detecting module 32 determines that the voltage inputted to the controller 3 is more than 9 volts, the power detecting module 32 commands the wireless transmission module 34 to perform the pairing procedure; otherwise, the wireless transmission module 34 performs the working procedure.

In further another embodiment, the power detecting module 32 determines whether the electricity characteristic of the power received by the controller 3 conforms to a range. The power detecting module 32 prevents the wireless transmission module 34 from performing the pairing procedure when the power detecting module 32 determines that the electricity characteristic does not conform to the range. For example, the power detecting module 32 commands the wireless transmission module 34 to perform the working procedure, or commands the wireless transmission module 34 to stay in its original state without further operation. However, the present disclosure does not use the above examples to limit the way of preventing the wireless transmission module 34 from performing the pairing procedure.

The pairing procedure is to pair the controller 3 with another controller of another bicycle component. In an embodiment, the pairing procedure is to send the pairing signal in a broadcast manner by the wireless transmission module 34, or receive the pairing signal from another bicycle component by the wireless transmission module 34 and store the pairing signal into the memory module 36. The pairing signal comprises an identification code of the main body 1.

In further another embodiment, the controller 3 comprises a first controller and a second controller that are fixed on the jig, and the power supply provides two default voltages to the two controllers respectively (the two default voltages are generally different, but they can also be the same value). The power detecting module of the first controller determines whether the electricity characteristic of the power received by the first controller conforms to a range, and the power detecting module of the second controller determines whether the electricity characteristic of the power received by the second controller conforms to another range. If the above two determinations are both positive, the first controller performs the pairing procedure to broadcast the pairing signal and the second controller performs the pairing procedure to receive the pairing signal. After the second controller, which is served as the receiver of the pairing signal, receives the pairing signal, the power supply connected to the first controller and the second controller can be removed, and then the first controller and the second controller are installed with batteries respectively so that the user may operate the first controller and the second controller that have been paired.

The working procedure is to send or receive a shifting signal to or from another bicycle component that has been paired by the controller 3.

Please refer to FIG. 1, the memory module 36 is configured to store the pairing signal received by the wireless transmission module 34 during the pairing procedure. For example, the memory module 36 can be implemented with an electrically-erasable programmable read-only memory (EEPROM), a programmable read-only memory (PROM) or a flash memory. However, the present disclosure is not limited in the above examples.

Figure 3:
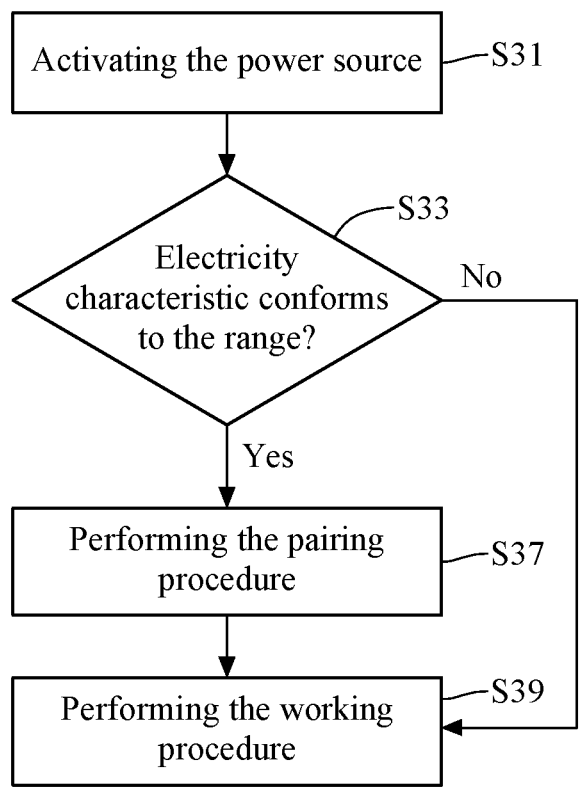
FIG. 3 is a flowchart of a pairing method according to an embodiment of the present disclosure.

Please refer to FIG. 3, which illustrates a flowchart of a pairing method of a bicycle component 10 according to an embodiment of the present disclosure.

Please refer to step S31, which shows "activating the power source". The power source is electrically connected to the controller 3 of the bicycle component 10. For example, the power source is one of the first power source V1 and the second power source V2 as shown in FIG. 1.

Please refer to step S33. After the power source is activated, the power detecting module 32 determines whether the electricity characteristic of the power provided by the power source conforms to a range. In an embodiment, the power detecting module 32 determines whether the range of the electricity characteristic of the power provided by the power source conforms to the range of the electricity characteristic of the first power source V1. In another embodiment, the power detecting module 32 determines whether the range of the electricity characteristic of the power provided by the power source conforms to the range of the electricity characteristic of the first power source V1 or conforms to the range of the electricity characteristic of the second power source V2.

Please refer to step S37. The controller 3 performs the pairing procedure when the electricity characteristic conforms to the range. Specifically, the power detecting module 32 commands the wireless transmission module 34 to perform the pairing procedure. In an embodiment, the pairing procedure is to send the pairing signal to another controller of another bicycle component by the wireless transmission module 34 of the controller 3, or to receive and store the pairing signal from another bicycle component.

Please refer to step S39, the controller 3 performs the working procedure when the electricity characteristic does not conform to the range. In an embodiment, the working procedure is to send or receive a shifting signal by the controller 3. For example, the shifting signal is a gear-changing signal, and the main body 1 is a shift derailleur unit. Therefore, the bicycle component 10 may adjust the derailleur to change the gear of the bicycle when the bicycle component 10 receives the shifting signal.

Please refer to steps S37-S39. The controller 3 performs the working procedure after the pairing procedure is completed. In other words, after the bicycle component 10 and another bicycle component have been paired, the bicycle component 10 can perform operations related to bicycle riding, such as shifting operation, speed measurement, or braking operation. However, the present disclosure does not limit the working procedure in the above examples.

In other embodiments, the power source can be turned off manually or automatically after the pairing procedure is completed. In other words, the pairing method of the bicycle component 10 of the present disclosure is completed after step S37 is completed, and the working procedure in step S39 will not be performed.

Figure 4:
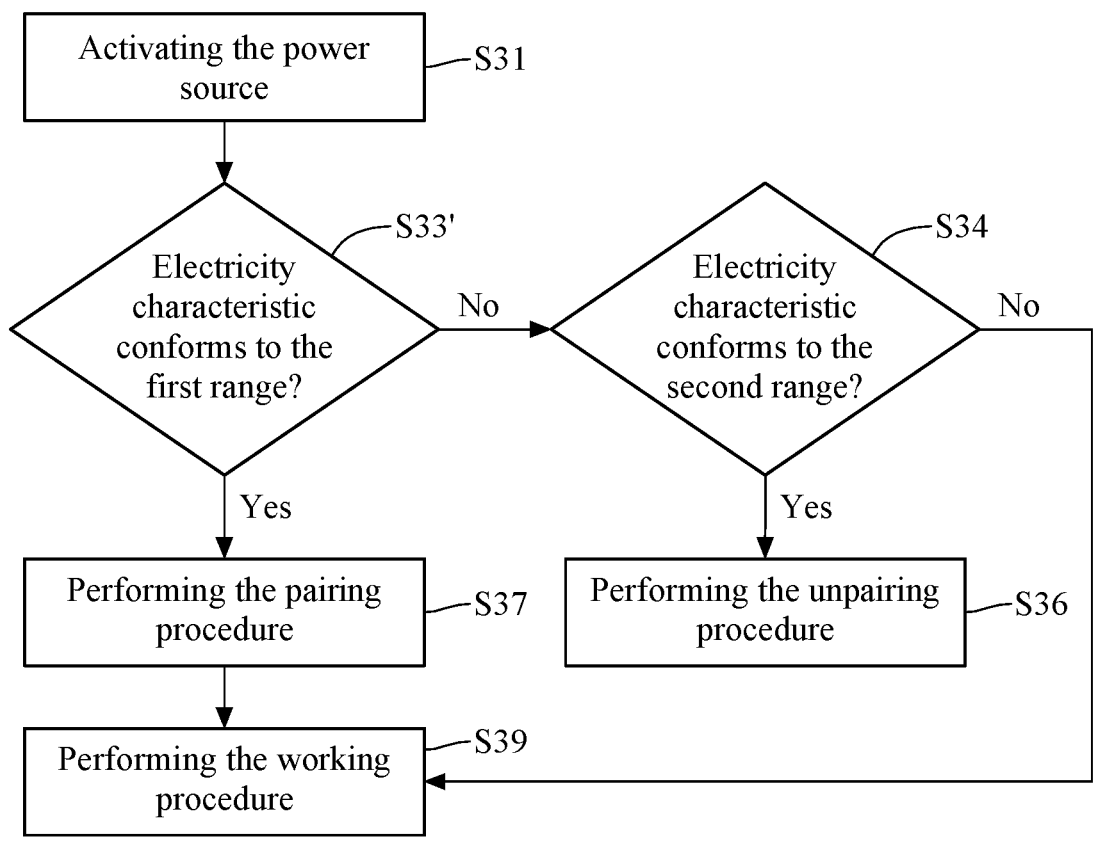
FIG. 4 is a flowchart of a pairing method according to another embodiment of the present disclosure.

Please refer to FIG. 4, which illustrates a flowchart of the pairing method of the bicycle component 10 according to another embodiment of the present disclosure. Compared with the embodiment shown in FIG. 3, this embodiment further comprises performing the pairing procedure, the working procedure, or the unpairing procedure selectively according to the electricity characteristics.

Step S31 of FIG. 4 is as same as step S31 of FIG. 3. Please refer to step S33' of FIG. 4. The power detecting module 32 determines whether the electricity characteristics of the power provided by the power source conforms to a first range. If the determination result of step S33' is positive, the following process is the same as the process shown in FIG. 3 and the description of this process is not repeated herein. On the other hand, if the determination result of step S33' is negative, step S34 will be performed then. In step S34, the power detecting module 32 determines whether the electricity characteristic of the power provided by the power source conforms to a second range. The second range is different from the first range. For example, the first range corresponds to the electricity characteristic of the power provided by the first power source V1, and the second range corresponds to the electricity characteristic of the power provided by the second power source V2. If the determination result of step S34 is negative, step S39 will be the next step to perform the working procedure. On the other hand, if the determination result of step S34 is positive, step S36 will be the next step for the controller 3 to perform a unpairing procedure. For example, the unpairing procedure is to clear the identification code of the main body of another bicycle component, wherein the identification code is stored in the pairing signal and the pairing signal is stored in the memory module 36. Performing the unpairing procedure may restore the unpaired state of the bicycle component 10.

Figure 5:
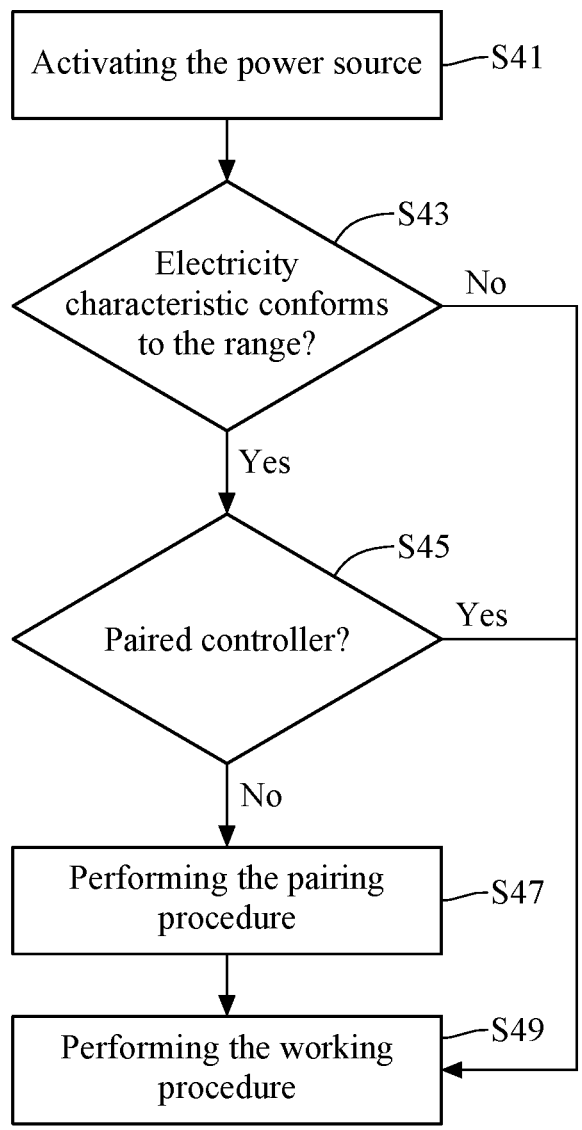
FIG. 5 is a flowchart of a pairing method according to further another embodiment of the present disclosure.

Please refer to FIG. 5, which illustrates a flowchart of the pairing method of bicycle component 10 according to further another embodiment of the present disclosure. Compared to the embodiment of FIG. 3, this embodiment further comprises an inspecting procedure for determining whether the controller 3 has been paired. One of the pairing procedure and the working procedure is performed selectively depend on the determination result.

Please refer to steps S41-S43, the power source is activated, and then the power detecting module 32 determines whether the electricity characteristic of the power provided by the power source conforms to a range. These two steps are basically identical to steps S31-S32 in FIG. 3.

Please refer to step S45, which determines that whether the controller 3 has been paired. Step S45 is the inspecting procedure configured to determine whether the bicycle component 10 has been paired with another bicycle component. If the determination result is positive, which means that the inspection procedure passes, the next step will be step S49 for performing the working procedure. If the determination result is negative, the next step will be step S47 for performing the pairing procedure. In an embodiment, the inspecting procedure is to determine whether the memory module 36 of the controller 3 stores a pairing signal. The pairing signal comprises an identification code configured to represent the main body of said another bicycle component. Therefore, if the memory module 36 stores the pairing signal, it means that the bicycle component 10 has been paired with another bicycle component previously, and the inspecting procedure passes. On the other hand, if the memory module 36 does not store any pairing signal, it means that the bicycle component 10 has not been paired with another bicycle component, and the inspecting procedure fails.

In other embodiments, step S45 can be modified adaptively to fit a "one-to-many" pairing type.

For example, the inspecting procedure of step S45 is to determine whether the number of paired devices of the controller 3 is equal to a threshold. For example, the bicycle component 10 of the present disclosure can be paired with three other bicycle components. In this case, the aforementioned threshold is set to 3. Therefore, if the number of paired devices determined in step S45 is 0, 1, or 2, the pairing procedure in step S47 should be performed. If the number of paired devices determined in step S45 is 3, it means that the bicycle component 10 has reached the upper limit of the number of paired devices, and the next step can be selectively performing the working procedure of step S49, or ending the pairing method of the bicycle component 10 of the present disclosure. The present disclosure does not limit thereto.

Steps S47 and S49 in FIG. 5 are basically identical to steps S37 and S39 in FIG. 3, and are not repeated here.

In view of the above description, the bicycle component and the pairing method thereof proposed by the present disclosure use the electricity characteristics of the power provided by the power source connecting the bicycle component to determine whether to perform a pairing procedure. When a general consumer obtains the bicycle components proposed by the present disclosure and inserts the battery therein, the pairing between the bicycle components may be completed immediately. Therefore, the consumer may save the time of reading the instruction guides, and save the effort of repeatedly trying the pairing operations. On the other hand, the bicycle component proposed by the present disclosure may adopt an integrally formed structure due to the reduction of the button design in appearance. At the same time, the bicycle component provided by the present disclosure has a better waterproof effect due to the reduction of the gap caused by the button.

What is claimed is:

1. A bicycle component comprising:
   a main body comprising an attaching portion configured to attach to a bicycle; and
   a controller disposed in the main body, wherein the controller is configured to receive a power from one of a power supply and a battery, a first range corresponding to an electricity characteristic of the power supply is different from a second range corresponding to an electricity characteristic of the battery, and the controller comprises:
   a power detecting module configured to determine whether an electricity characteristic of the power conforms to the first range or the second range, thereby identifying whether the power is sourced from the power supply or the battery; and
   a wireless transmission module electrically connecting the power detecting module, wherein the wireless transmission module is configured to perform a pairing procedure when the power is sourced from the power supply, and not to perform the pairing procedure when the power is sourced from the battery.

2. The bicycle component of claim 1, further comprising a power source configured to generate the power, wherein the power source is removably connected to the controller.

3. The bicycle component of claim 1, wherein the pairing procedure comprises sending a pairing signal in a broadcast manner by the wireless transmission module.

4. The bicycle component of claim 3, wherein the main body is a shift operating unit or a shift derailleur unit, and the pairing signal comprises an identification code of the main body.

5. The bicycle component of claim 1, wherein the controller further comprises a memory module electrically connecting the wireless transmission module, and the pairing procedure comprises receiving a pairing signal from another bicycle component by the wireless transmission module and storing the pairing signal in the memory module.

6. The bicycle component of claim 1, wherein the electricity characteristic of the power is a voltage, and the voltage of the power is greater than a default voltage.

7. The bicycle component of claim 1, wherein the electricity characteristic of the power is a pulse-width modulation, and a modulation frequency of the power is greater than a default modulation frequency.

8. The bicycle component of claim 1, wherein the power detecting module commands the wireless transmission module to perform the pairing procedure when the power detecting module determines that the electricity characteristic of the power conforms to the first range or the second range.

* * * * *